United States Patent
Shinoda

(10) Patent No.: US 7,844,249 B2
(45) Date of Patent: Nov. 30, 2010

(54) IN-VEHICLE COMMUNICATION APPARATUS AND POSITION INFORMATION NOTIFYING SYSTEM

(75) Inventor: Kouji Shinoda, Farmington Hills, MI (US)

(73) Assignee: Denso Corporation, Kariya (JP)

( * ) Notice: Subject to any disclaimer, the term of this patent is extended or adjusted under 35 U.S.C. 154(b) by 647 days.

(21) Appl. No.: 11/982,702

(22) Filed: Nov. 2, 2007

(65) Prior Publication Data

US 2008/0293391 A1 Nov. 27, 2008

(30) Foreign Application Priority Data

Nov. 6, 2006 (JP) ............... 2006-300222

(51) Int. Cl.
*H04M 11/04* (2006.01)
(52) U.S. Cl. ............... 455/404.2; 455/404.1; 455/414.1
(58) Field of Classification Search ............... 455/404.1, 455/404.2, 414.1
See application file for complete search history.

(56) References Cited

U.S. PATENT DOCUMENTS

2007/0026842 A1* 2/2007 Haave et al. ............. 455/404.2

FOREIGN PATENT DOCUMENTS

| JP | 2006-089020 | 4/2006 |
|---|---|---|
| JP | 2006-089021 | 4/2006 |
| JP | 2006-142910 | 6/2006 |

* cited by examiner

*Primary Examiner*—Barry W Taylor
(74) *Attorney, Agent, or Firm*—Harness, Dickey & Pierce, PLC

(57) ABSTRACT

An incoming call waiting date and time is specified to exceed a time when a predetermined period passes after an ACC switch of an in-vehicle emergency call apparatus is switched from ON to OFF. In this case, a low power operation is continued in the in-vehicle emergency call apparatus until the incoming call waiting date and time, even after the predetermined period passes from when the ACC switch is switched from ON to OFF. Even after the predetermined period passes from when the ACC switch is switched from ON to OFF, a position information signal can be thereby transmitted to a service center based on a reception of a positional information request signal from the service center. Thus, a stolen vehicle search can be executed appropriately.

3 Claims, 3 Drawing Sheets

IN-VEHICLE COMMUNICATION APPARATUS AND POSITION INFORMATION NOTIFYING SYSTEM

CROSS REFERENCE TO RELATED APPLICATION

This application is based on and incorporates herein by reference Japanese Patent Application No. 2006-300222 filed on Nov. 6, 2006.

FIELD OF THE INVENTION

The present invention relates to an in-vehicle communication apparatus. In the in-vehicle communication apparatus, a power for the apparatus can be switched from ON to OFF when a predetermined period passes after a predetermined switch changes from ON to OFF, and a position information signal can be transmitted to a service center based on a reception of a position information request signal from the service center if the power is ON. The present invention further relates to a position information notifying system including the in-vehicle communication apparatus and the service center.

BACKGROUND OF THE INVENTION

For example, an in-vehicle emergency call apparatus acquires and stores position information and transmits a position information signal including the stored position information to a service center for the purpose of an emergency call when a start trigger occurs, e.g., a traffic accident occurs (refer to Patent document 1).

Patent document 1: JP-2006-89020 A

Such an in-vehicle emergency call apparatus transmits a position information signal to the service center for the purpose of the emergency call when the ACC switch is ON. Incidentally, the apparatus is configured to be further used, e.g., for a stolen vehicle search other than the emergency call. In this case, a position information signal can be transmitted to the service center based on a reception of a position information request signal from the service center even when the ACC switch is OFF.

Further, in this case, the in-vehicle emergency call apparatus does not switch the power from ON to OFF immediately after the ACC switch is switched from ON to OFF. Until a predetermined period (e.g., one week) passes after the ACC switch is switched from ON to OFF, the power remains ON. Thus, until the predetermined period passes from when the ACC switch is switched from ON to OFF, a position information signal can be transmitted to the service center based on a reception of a position information request signal from the service center.

Thus, a position information signal can be transmitted to the service center, however, only for the predetermined period. In other words, after the predetermined period passes, any position information signal cannot be transmitted to the service center. Therefore, the stolen vehicle search cannot be executed appropriately.

SUMMARY OF THE INVENTION

The present invention is made in view of the above-mentioned situation. It is an object to provide an in-vehicle communication apparatus and a position information notifying system including the in-vehicle communication apparatus and a service center. In the in-vehicle communication apparatus, even after a predetermined period passes from when an ACC switch is switched from ON to OFF, a position information signal can be transmitted to the service center based on a reception of a position information request signal from the service center. For instance, this configuration can be appropriately used for a stolen vehicle search.

To achieve the above object, according to an example of the present invention, an in-vehicle communication apparatus is provided as follows. A communication unit is configured to receive a position information request signal from a service center. A position information acquisition unit is configured to acquire position information. A control unit is configured to switch a power from ON to OFF when a predetermined period passes after a predetermined switch changes from ON to OFF, and to transmit a position information signal including the position information acquired by the position information acquisition unit to the service center via the communication unit if the communication unit receives the position information request signal from the service center while the power is ON. Here, when an incoming call waiting date and time is specified from the service center, the control unit continues to cause the power to be ON until the incoming call waiting date and time even if the predetermined period passes after the predetermined switch changes from ON to OFF with the power being ON.

Furthermore, as another example of the present invention, a position information notifying system is provided to include (i) the above-mentioned in-vehicle communication apparatus and (ii) the service center which specifies the incoming call waiting date and time while transmitting the position information request signal to the in-vehicle communication apparatus.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
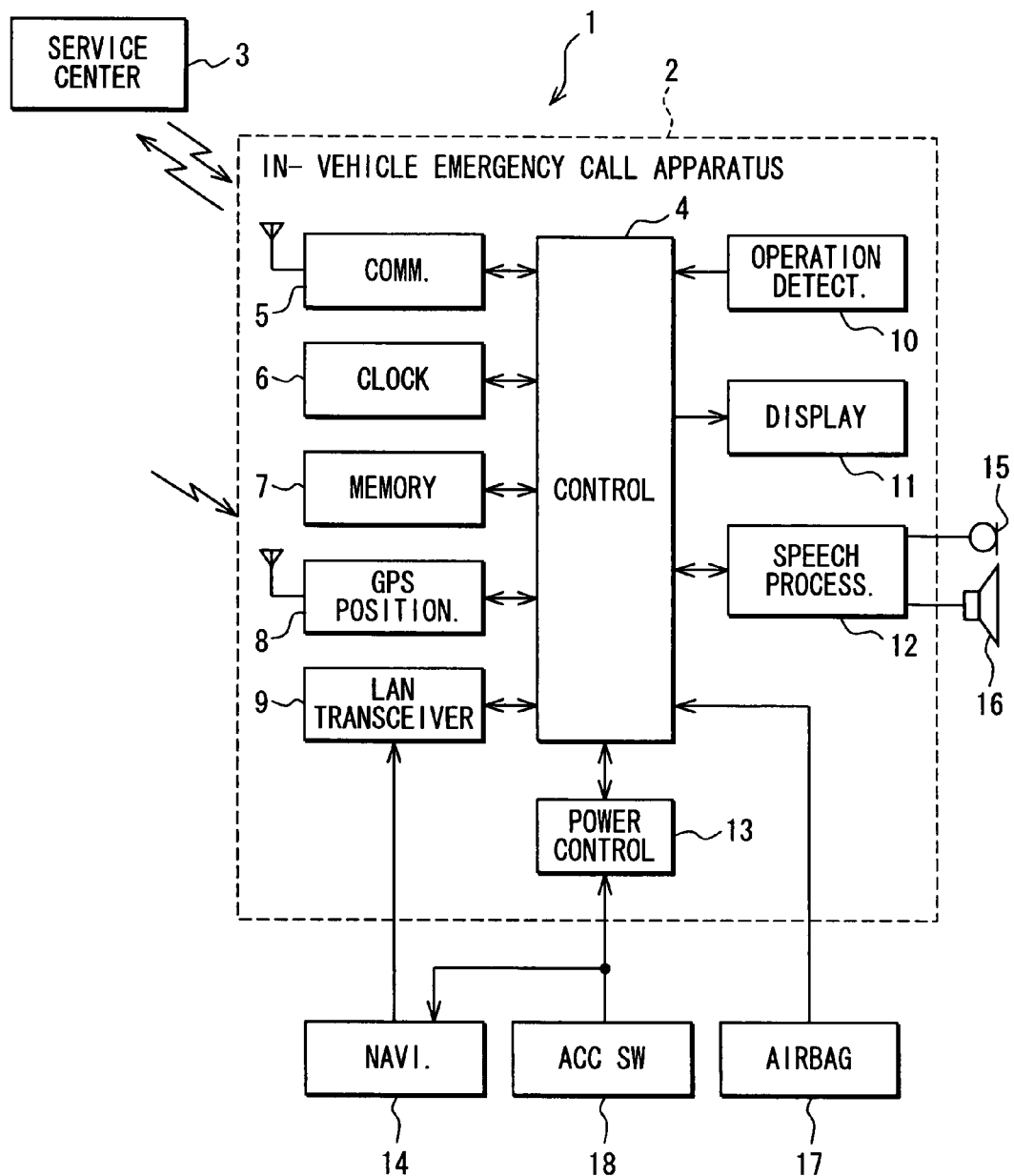
FIG. 1 is a functional block diagram illustrating an overall configuration of a position information notifying system according to an embodiment of the present invention.

An in-vehicle emergence apparatus as an embodiment according to an in-vehicle communication apparatus of the present invention will be explained with reference to drawings. FIG. 1 indicates a configuration of a position information notifying system 1 in a functional block diagram. In the position information notifying system 1, a service center 3 and an in-vehicle emergency call apparatus 2 mounted in a subject vehicle are communicated with each other via a wireless communication network. The in-vehicle emergency call apparatus 2 includes a control unit 4, a wireless communication unit 5, a clock unit 6, a memory unit 7, a GPS positioning unit 8 as a position information acquisition unit, a LAN (Local Area Network) transceiver unit 9, an operation detection unit 10, a display unit 11, a speech processor 12, and a power control unit 13.

The control unit 4 includes a CPU and controls overall operation of the in-vehicle emergency call apparatus 2. The wireless communication unit 5 transmits a position information signal including position information to the service center 3 through the wireless communication network when the control unit 4 inputs a transmission command signal when an emergency call or stolen vehicle search is needed. The clock unit 6 counts time when receiving a clocking command signal from the control unit 4. The GPS positioning unit 8 receives a GPS signal transmitted from GPS satellites, when receiving a positioning command signal from the control unit 4. The GPS positioning unit 8 then extracts positioning assist information (almanac data, ephemeris data, etc.) which is needed for acquiring position information from the GPS signal, and calculates the positioning assist information to acquire position information (latitude and longitude).

The LAN transceiver unit 9 has an interface function with an in-vehicle LAN, and transmits and receives the variety of information with a navigation system 14. When the navigation system 14 is normally operating, position information (latitude and longitude) is periodically received and acquired from the navigation system 14 (e.g., every second). In this case, when the position information acquired from the navigation system 14 is compared with position information detected and acquired by the GPS positioning unit 8 (by calculating the positioning assist information), there is a difference. The former is amended by map matching process along with a speed signal or detection result of a gyroscope, so the positioning accuracy of the former is higher than the latter. Moreover, when the navigation system 14 normally operates, the LAN transceiver unit 9 receives and acquires the position information from the navigation system 14 while receiving and acquiring the travel speed, the travel distance, etc., from the navigation system 14.

The memory unit 7 stores in a time series the variety of information, i.e., the position information which the LAN transceiver unit 9 receives and acquires from the navigation system 14 and the position information which the GPS positioning unit 8 detects and acquires. In this case, the control unit 4 stores position information items of a predetermined number (e.g., ten items) at the maximum tracing back to the past from the newest position information item in the memory unit 7. If storing the newest position information item in the memory unit 7 when the position information items of the predetermined number are stored, the earliest position information item is eliminated from among the stored position information items of the predetermined number, and the newest one is then stored.

The operation detection unit 10 outputs an operation detecting signal to the control unit 4 when the user operates an emergency call button. The display unit 11 displays display information based on a display command signal inputted from the control unit 4. The speech processor 12 performs speech processing for transmit sounds inputted via a microphone 15 or receive sounds outputted via a speaker 16. In this case, when a voice call (voice call link) is connected between the in-vehicle emergency call apparatus 2 and the service center 3, the user (driver) can make a voice call (conversation) with an operator in the service center 3 using the microphone 15 and speaker 16, thereby demanding rescue orally or reporting the degree of an accident.

The power control unit 13 receives the ACC ON signal and ACC OFF signal from an ACC (accessory) switch 18. An airbag system 17 detects a collision of the vehicle and outputs a collision detection signal to the control unit 4 if the impact is more than a predetermined level.

With the above-mentioned configuration, the control unit 4 causes the in-vehicle emergency call apparatus 2 to perform a normal operation when the power control unit 13 inputs the ACC ON signal from the ACC switch 18. When the ACC OFF signal is inputted from the ACC switch 18, the control unit 4 starts a timer and at the same time causes the in-vehicle emergency call apparatus 2 to start a low power operation. When a predetermined period (for example, one week) passes after the ACC OFF signal is inputted from the ACC switch 18 (i.e., the ACC switch 18 is switched from ON to OFF), the low power operation can be stopped (i.e., the power for the apparatus 2 can be turned OFF).

In contrast, when the control unit 4 causes the in-vehicle emergency call apparatus 2 to perform the normal operation, the following takes place. The control unit 4 detects an emergency call trigger if receiving (i) an operation detecting signal from the operation detection unit 10 according to the user's operating an emergency call button or (ii) a collision detection signal from the airbag system 17. The control unit 4 then performs an emergency call, i.e., transmission of the position information signal including the position information to the service center 3 via the wireless communication unit 5. The position information is detected and acquired by the GPS positioning unit 8 or received and acquired from the navigation system 14 by the LAN transceiver unit 9.

Further, when the control unit 4 causes the in-vehicle emergency call apparatus 2 to perform the normal operation or the low power operation, the following takes place. The control unit 4 detects a start trigger of a stolen vehicle search when receiving a stolen vehicle search request signal from the service center 3. When the wireless communication unit 5 thereafter receives a position information request signal from the service center 3, the control unit 4 performs a stolen vehicle search, i.e., transmission of a position information signal including the position information via the wireless communication unit 5. The position information is detected and acquired by the GPS positioning unit 8. In the above configuration, the in-vehicle emergency call apparatus 2 and the navigation system 14 can be connected not only via the in-vehicle LAN but also via a USB (Universal Serial Bus). Moreover, the navigation system 14 starts when the ACC ON signal is inputted from the ACC switch 18, and stops when the ACC OFF signal is inputted from the ACC switch 18.

An operation of the above configuration will be explained with reference to FIGS. 2, 3. It is assumed herein that the ACC switch 18 is OFF (i.e., on an OFF state). For example, the user recognizes a theft of the vehicle and notifies an operator of the service center 3. In response to the notification, the operator makes a call to a called party, i.e., the in-vehicle emergency call apparatus 2. As the voice call link is connected with the in-vehicle emergency call apparatus 2, the operator transmits a stolen vehicle search request signal including an incoming call waiting date and time. The service center 3 once cuts the voice call link with the in-vehicle emergency call apparatus 2, and then re-connects a voice call link with the in-vehicle emergency call apparatus 2.

In the in-vehicle emergency call apparatus 2, when detecting that the wireless communication unit 5 receives the stolen vehicle search request signal from the service center 3, the control unit 4 transmits a stolen vehicle search response signal to the service center 3 via the wireless communication unit 5. The service center 3 authenticates the in-vehicle emergency call apparatus 2 when receiving the stolen vehicle search response signal from the in-vehicle emergency call apparatus 2. When the in-vehicle emergency call apparatus 2 is authenticated, an authentication confirming signal is transmitted to the in-vehicle emergency call apparatus 2.

The control unit 4 detects that the wireless communication unit 5 receives the authentication confirming signal from the service center 3. Thereafter, the control unit 4 stands by or waits while determining whether the wireless communication unit 5 receives a position information request signal or a stolen vehicle search stop request signal from the service center 3. Further, in parallel, the control unit 4 determines whether a predetermined period (e.g., one week) passes after the ACC switch 18 is switched from ON to OFF while determining whether the incoming call waiting date and time specified by the service center 3 is reached.

When determining that the wireless communication unit 5 receives the position information data request signal from the service center 3, the control unit 4 outputs a positioning command signal to the GPS positioning unit 8. The control unit 4 then acquires the position information from the GPS positioning unit 8, and transmits a position information signal including the acquired position information to the service center 3 via the wireless communication unit 5. Thus, by transmitting the position information request signal from the service center 3, the operator can confirm the position of the in-vehicle emergency call apparatus 2 (i.e., vehicle position) to thereby perform the stolen vehicle search. Moreover, immediately after transmitting the position information signal to the service center 3 via the wireless communication unit 5, the control unit 4 detects that the wireless communication unit 5 receives the stolen vehicle search stop request signal from the service center 3. The control unit 4 then transmits a stolen vehicle search stop response signal to the service center 3 via the wireless communication unit 5. The voice call link with the service center 3 is thereby cut.

Figure 2:
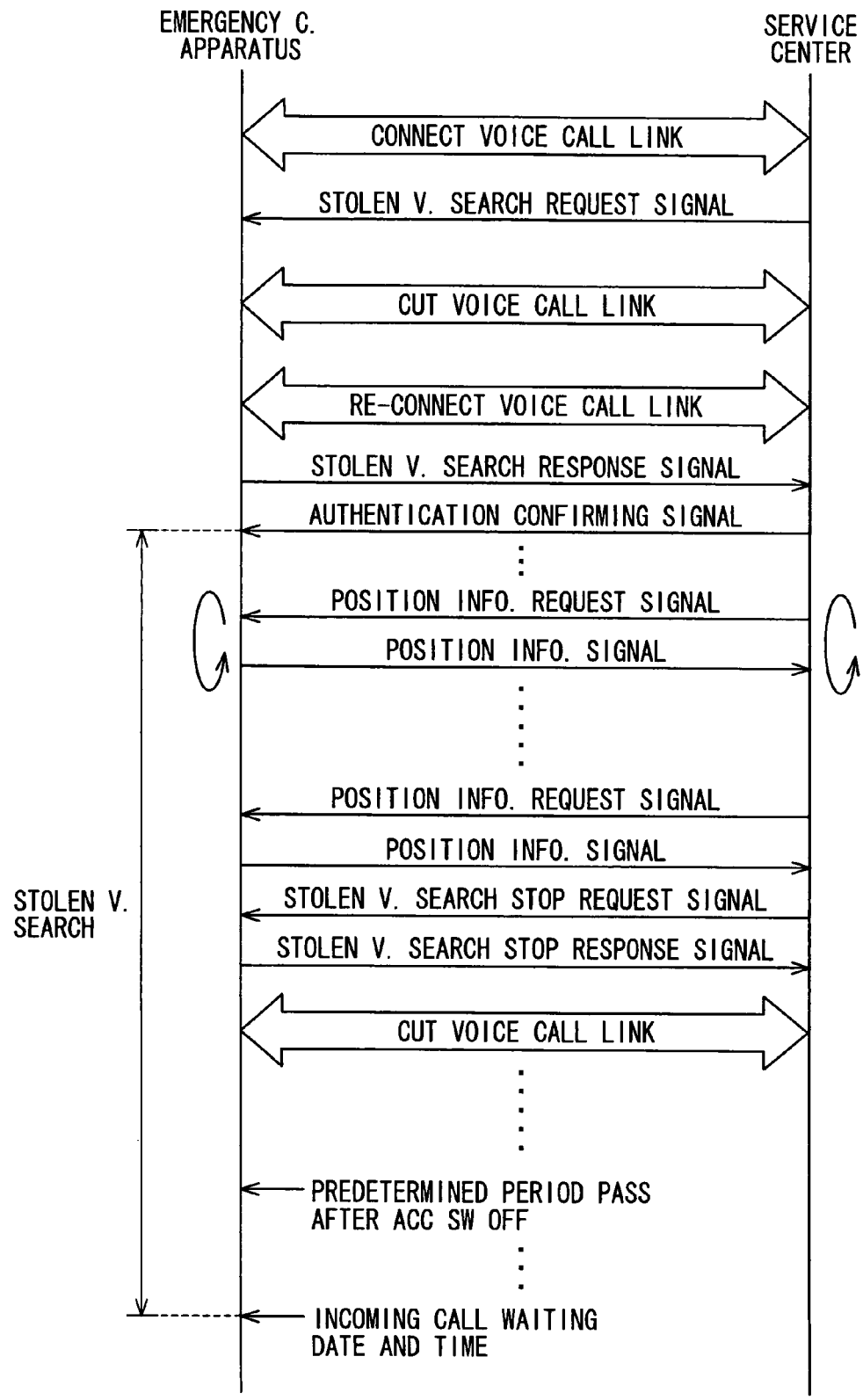
FIG. 2 is a sequence diagram.

With reference to FIG. 2, the control unit 4 detects that the predetermined period passes from when the ACC switch 18 is switched from ON to OFF before the incoming call waiting date and time specified by the service center 3 is reached. In other words, the control unit 4 detects that the incoming call waiting date and time specified by the service center 3 is not reached even after the predetermined period passes from when the ACC switch 18 is switched from ON to OFF. In this case, the control unit 4 continues the low power operation of the in-vehicle emergency call apparatus 2 without stopping it, and stops the low power operation (i.e., turns off the power of the apparatus 2) at the incoming call waiting date and time.

Figure 3:
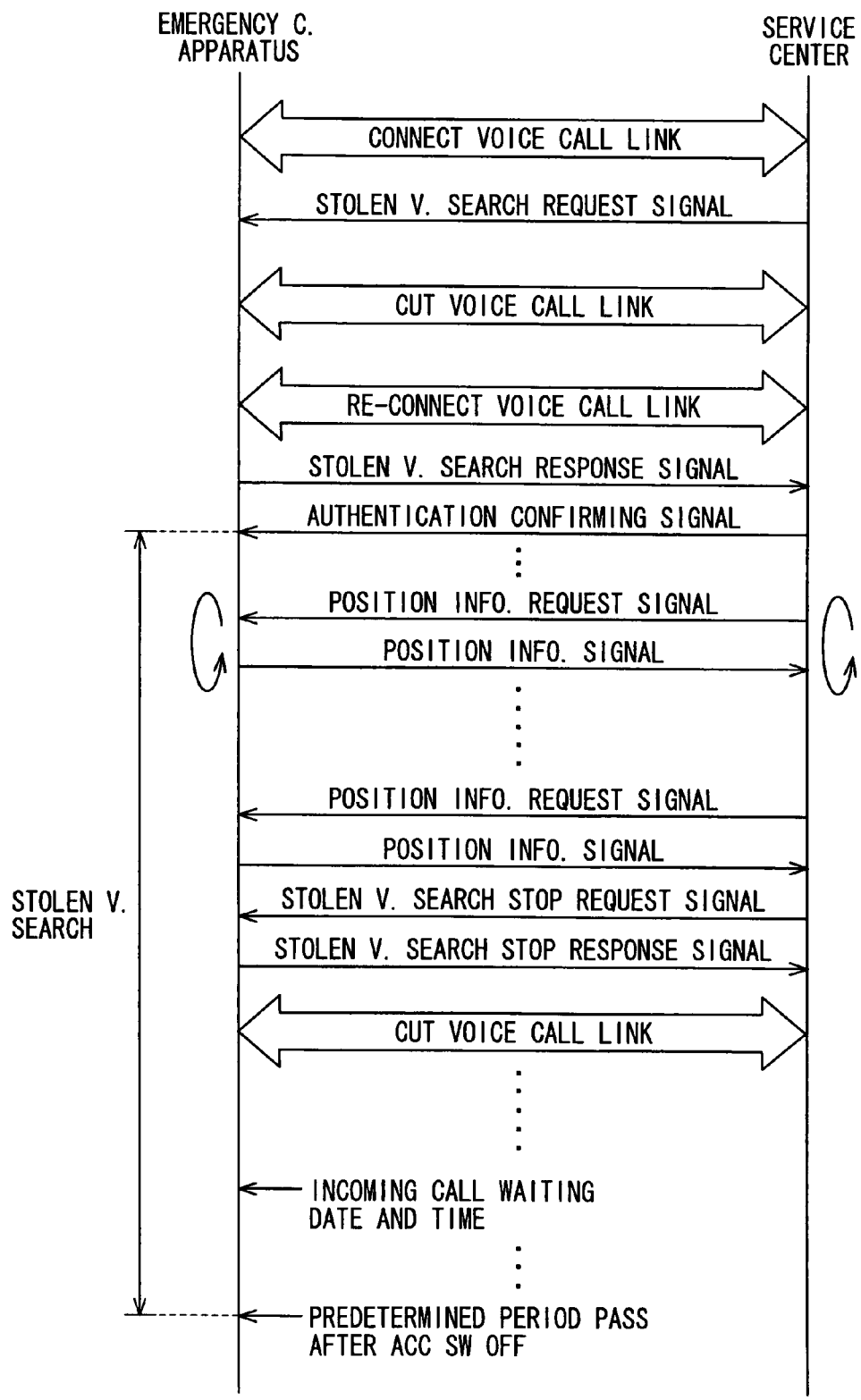
FIG. 3 is another sequence diagram.

In contrast, with reference to FIG. 3, the control unit 4 detects that the incoming call waiting date and time specified by the service center 3 is reached before the predetermined period passes from when the ACC switch 18 is switched from ON to OFF. In other words, the control unit 4 does not detect at the incoming call waiting date and time specified by the service center 3 that the predetermined period passes from when the ACC switch 18 is switched from ON to OFF. In this case, the control unit 4 does not stop the low power operation at the incoming call waiting date and time, but stops the low power operation when the predetermined period passes after the ACC switch 18 is switched from ON to OFF. The above situations are based on the assumption that the ACC switch 18 is OFF. However, even if the ACC switch 18 is ON (on an ON state), the normal operation is stopped similarly when the above-mentioned conditions are satisfied.

Thus, according to the embodiment, an incoming call waiting date and time may be specified to exceed a time when a predetermined period passes after the ACC switch 18 of the in-vehicle emergency call apparatus 2 is switched from ON to OFF. In this case, a low power operation is continued until the incoming call waiting date and time even after the predetermined period passes from when the ACC switch 18 is switched from ON to OFF. Thus, until the incoming call waiting date and time, a position information signal can be transmitted to a service center 3 based on a reception of a position information request signal from the service center 3. The stolen vehicle search can be thereby executed appropriately.

In contrast, an incoming call waiting date and time may be specified not to exceed a time when the predetermined period passes after the ACC switch 18 of the in-vehicle emergency call apparatus 2 is switched from ON to OFF. In this case, a low power operation is continued until the predetermined period passes from when the ACC switch 18 is switched from ON to OFF. Thus, until the predetermined period passes from when the ACC switch 18 is switched from ON to OFF, a position information signal can be transmitted to the service center 3 based on a reception of a position information request signal from the service center 3 and the stolen vehicle search can be executed appropriately. Moreover, when the predetermined period passes after the ACC switch 18 is switched from ON to OFF, the low power can be stopped, and the power consumption in the battery capacity can be reduced.

The present invention is not limited only to the above-mentioned embodiment, and can be modified or extended as follows. Part of the in-vehicle communication apparatus can be included in a navigation system. Moreover, the in-vehicle communication apparatus may not be necessarily limited to an in-vehicle emergency call apparatus cooperative with an airbag system, but may be an apparatus dedicated for a stolen vehicle search. When the position information request signal is received from the service center, the position information only acquired from the GPS positioning unit need not be transmitted. For example, if the navigation system operates in the low power operation in interlock with the in-vehicle emergency call apparatus, the position information which the LAN transceiver unit receives and acquires from the navigation system can be transmitted. Moreover, the position information acquired from the GPS positioning unit and the position information acquired from the navigation system can be selectively transmitted.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As an aspect, an in-vehicle communication apparatus is provided as follows. A communication unit is configured to receive a position information request signal from a service center. A position information acquisition unit is configured to acquire position information. A control unit is configured to switch a power from ON to OFF when a predetermined period passes after a predetermined switch changes from ON to OFF, and to transmit a position information signal including the position information acquired by the position information acquisition unit to the service center via the communication unit if the communication unit receives the position information request signal from the service center while the power is ON. Here, when an incoming call waiting date and time is specified from the service center, the control unit continues to cause the power to be ON until the incoming call waiting date and time even if the predetermined period passes after the predetermined switch changes from ON to OFF with the power being ON.

Under the above configuration, an incoming call waiting date and time is specified to exceed a time when the predetermined period passes after the predetermined switch is switched from ON to OFF. Thus, even after the predetermined period passes, a position information signal can be transmitted to the service center based on a reception of a position information request signal from the service center until the incoming call waiting date and time. For instance, a stolen vehicle search can be executed appropriately.

In the above in-vehicle communication apparatus, the control unit may switch the power from ON to OFF if the incoming call waiting date and time is reached when the predetermined period passes after the predetermined switch changes from ON to OFF with the power being ON.

Under the above configuration, an incoming call waiting date and time may be specified not to exceed a time when the predetermined period passes after the predetermined switch is switched from ON to OFF. In this case, until the predetermined period passes, a position information signal can be transmitted to the service center based on a reception of a position information request signal from the service center. For instance, a stolen vehicle search can be also executed appropriately.

Moreover, when the predetermined period passes after the predetermined switch is switched from ON to OFF, the power can be switched from ON to OFF. This helps reduce the power consumption in the battery capacity.

Furthermore, as another aspect, a position information notifying system is provided to include (i) the above-mentioned in-vehicle communication apparatus and (ii) the service center which specifies the incoming call waiting date and time while transmitting the position information request signal to the in-vehicle communication apparatus.

It will be obvious to those skilled in the art that various changes may be made in the above-described embodiments of the present invention. However, the scope of the present invention should be determined by the following claims.

What is claimed is:

1. An in-vehicle communication apparatus comprising:
   a communication unit configured to receive a position information request signal from a service center;
   a position information acquisition unit configured to acquire position information; and
   a control unit configured to switch a power from ON to OFF when a predetermined period passes after a predetermined switch changes from ON to OFF, and to transmit a position information signal including the position information acquired by the position information acquisition unit to the service center via the communication unit if the communication unit receives the position information request signal from the service center while the power is ON, wherein
   when an incoming call waiting date and time is specified from the service center, the control unit continues to cause the power to be ON until the incoming call waiting date and time even if the predetermined period passes after the predetermined switch changes from ON to OFF with the power being ON.

2. The in-vehicle communication apparatus of claim 1, wherein
   the control unit switches the power from ON to OFF if the incoming call waiting date and time is reached when the predetermined period passes after the predetermined switch changes from ON to OFF with the power being ON.

3. A position information notifying system, comprising:
   the in-vehicle communication apparatus of claim 1; and
   the service center which specifies the incoming call waiting date and time while transmitting the position information request signal to the in-vehicle communication apparatus.

* * * * *